US010346525B2

(12) United States Patent
Block et al.

(10) Patent No.: US 10,346,525 B2
(45) Date of Patent: Jul. 9, 2019

(54) ELECTRONIC NEWSPAPER

(71) Applicant: Block Communications, Inc., Toledo, OH (US)

(72) Inventors: Allan James Block, Toledo, OH (US); John David Crisp, Sylvania, OH (US); Erlend I. Viddal, Tampa, FL (US); Ronnie Jack Willis, Jr., Tampa, FL (US)

(73) Assignee: BLOCK COMMUNICATIONS, INC., Toledo, OH (US)

( * ) Notice: Subject to any disclaimer, the term of this patent is extended or adjusted under 35 U.S.C. 154(b) by 0 days.

(21) Appl. No.: 15/006,466

(22) Filed: Jan. 26, 2016

(65) Prior Publication Data

US 2016/0140093 A1 May 19, 2016

Related U.S. Application Data

(63) Continuation of application No. 13/449,973, filed on Apr. 18, 2012, now abandoned.

(60) Provisional application No. 61/606,073, filed on Mar. 2, 2012, provisional application No. 61/476,411, filed on Apr. 8, 2011.

(51) Int. Cl.
*G06F 17/21* (2006.01)
*G06F 17/22* (2006.01)
*G06Q 30/02* (2012.01)
*G06F 3/0483* (2013.01)
*G06F 3/0487* (2013.01)
(Continued)

(52) U.S. Cl.
CPC ........ *G06F 17/2288* (2013.01); *G06F 3/0483* (2013.01); *G06F 3/0487* (2013.01); *G06F 16/958* (2019.01); *G06F 17/211* (2013.01); *G06F 17/2205* (2013.01); *G06F 17/2235* (2013.01); *G06F 17/2247* (2013.01); *G06F 17/24* (2013.01); *G06F 17/248* (2013.01); *G06Q 30/0277* (2013.01); *G06F 2203/04806* (2013.01)

(58) Field of Classification Search
CPC .................................................. G06F 17/2288
See application file for complete search history.

(56) References Cited

U.S. PATENT DOCUMENTS

2002/0152245 A1\* 10/2002 McCaskey .......... G06F 17/3089
715/234
2003/0200507 A1\* 10/2003 Stern ..................... G06F 17/211
715/249

(Continued)

*Primary Examiner* — Scott T Baderman
*Assistant Examiner* — Seung Woon Jung
(74) *Attorney, Agent, or Firm* — William J. Clemens; Shumaker, Loop & Kendrick, LLP

(57) ABSTRACT

A method for creating static and dynamic formats of an electronic newspaper, including importing data files containing newspaper content having a PDF or PNG format from a database, converting the imported data files to a HTML format, creating daily newspaper pages in an HTML format from the HTML converted data files using HTML daily page templates, presenting the created newspaper pages in the HTML format in an HTML environment through a web browser of a user interface device, converting the created newspaper pages in the HTML format to a PNG format, and presenting the created daily newspaper pages in the PNG format through the web browser of the user interface device as a static digital replica of a printed newspaper.

7 Claims, 19 Drawing Sheets

(51) Int. Cl.
*G06F 17/24* (2006.01)
*G06F 16/958* (2019.01)

(56) References Cited

U.S. PATENT DOCUMENTS

| | | | | |
|---|---|---|---|---|
| 2007/0089053 | A1* | 4/2007 | Uhlig | G06F 17/212 |
| | | | | 715/255 |
| 2008/0082903 | A1* | 4/2008 | McCurdy | G06F 17/30011 |
| | | | | 715/200 |
| 2008/0092071 | A1* | 4/2008 | Chiu | G06Q 30/0258 |
| | | | | 715/764 |
| 2008/0288976 | A1* | 11/2008 | Carson | G06Q 30/0241 |
| | | | | 725/34 |
| 2010/0070576 | A1* | 3/2010 | Le Chevalier | G06F 17/3089 |
| | | | | 709/203 |
| 2010/0257443 | A1* | 10/2010 | Zernik | G06F 17/24 |
| | | | | 715/239 |
| 2011/0041050 | A1* | 2/2011 | Taylor | G06F 17/2235 |
| | | | | 715/229 |
| 2011/0131482 | A1* | 6/2011 | Shteinvil | G06F 17/218 |
| | | | | 715/229 |
| 2011/0209051 | A1* | 8/2011 | Shiimori | G06F 17/30905 |
| | | | | 715/255 |
| 2012/0221449 | A1* | 8/2012 | Kief | G06F 17/3089 |
| | | | | 705/34 |

\* cited by examiner

| STATUS |
|---|
| THIS OPTION CONTROLS THE PUBLISH STATUS OF THE ITEM. |
| DRAFT: THIS STATUS IS THE DEFAULT STATUS FOR NEW ITEMS. |
| DRAFT APPROVAL: ITEMS THAT NEEDS TO BE APPROVED BY AN EDITOR SHOULD BE GIVEN THIS STATUS. |
| APPROVED: ITEMS THAT HAVE BEEN APPROVED BY AN EDITOR SHOULD BE GIVEN THIS STATUS. |
| UNPUBLISHED: THE STATUS IS USED FOR ITEMS THAT HAVE MANUALLY UNPUBLISHED FROM THE WEBSITE. |
| RESTRICTED: THIS STATUS IS USED FOR ITEM THAT HAVE COME IN THROUGH A FEED AND YOU DON'T HAVE PUBLISHING RIGHTS. |
| PUBLISHING: THE ITEM IS TO BE SHOWN ON THE WEBSITE. |
| ARCHIVED: THE ITEM HAS BEEN DEPUBLISHED BY PUBLISH SETTINGS. |
| SUPERSEEDED: THIS ITEM HAS BEEN SUPERSEEDED BY A VERSION OF THE ITEM. |

48 → 
| ○ | PUBLISHED | 4/28 |
| ○ | [APPROVED] | 4/26 |
| ○ | PUBLISHED | 4/24 |

FIG. 16

50 →
| ○ | PUBLISHED | 4/28 |
| ○ | [APPROVED ◊] | ✔26/XX |
| ○ | PUBLISHED | 4/24 |

DRAFT
NEED APPROVAL
✓APPROVED
UNPUBLISHED
RESTRICTED
PUBLISHED
ARCHIVED
SUPERSEDED

| STORIES | | | | | | | | |
|---|---|---|---|---|---|---|---|---|
| Sections | Publish Date | Channel | | | | | | |
| Status | Pub Date | Price | Section | Title | Last updated | Media | Tags | Story ID |
| ●Published | XX/XX/XX | | Neighborhood | Pictures are worth 1,000 words | XX/XX/XX | | 2 | 0516001 |
| ●Draft | XX/XX/XX | | News | Then we can whom our stay | XX/XX/XX | | | 0519001 |

| STORIES | | | | | | | |
|---|---|---|---|---|---|---|---|
| Sections | Publish Date | Channel | | | | | |
| Status | Pub Date | Slug | Length | Page | Last updated | Media | |
| ●Published | XX/XX/XX | Tornado | 14.4 | A1 | XX/XX/XX | | |
| ●Draft | XX/XX/XX | China International | 21.8 | A4 | XX/XX/XX | 2 | |

58

Slug: Tornado   Print section: News   Page: A3
Web title: More than 100 feared         Section: Local
dead in Missouri tornado
Web: Published        Print: Draft                1 photo request   By: AP
Word count: 462 ◆6 ▭1   Est. length: 15 ◆2         View package     Editor: Greg Braknis
                                                                    ●Web: 11:49am today
                                                                    Print: Tomorrow
                                                                    Budget: 10:49am Slug: Gernot   Print section: Local   Page: Unassigned   Section: Education
Web title: Ex-school chief to get
$552,650 in settlement
Web: Published        Print: Draft                1 photo request   By: Jennifer Feehan
Word count: 653 ◆1    Est. length: 15 ◆2                            Editor: Bettyann Cole
                                                                    ●Web: 5:39am today
                                                                    ◐Print: Tomorrow
                                                                    Budget: 3:18am Slug: Flood
Web title: Flooding closes                        Section: Local
roads, some Metroparks
Web: Published                                    1 photo request   By: Staff
Word count: 122                                   1 video request   Editor: Nick Schroder
                                                                    ◐Web: 11:49am today
                                                                    Print: None
                                                                    Budget: 12:49am Slug: Lighting   Print section: Sports   Page: C1
Web title: Lightning vs. Bruins          Section: Sports
Game 7 mainbar
Web: Published        Print: Draft                1 photo request   By: Ronnie J. Wills
Word count: 0         Est. length: 25-30          View package      Editor: Tiffini Theisen
                                                  Event info        ●Web: pending
                                                                    Print: Tomorrow
                                                                    Budget: 6:21am

| | | |
|---|---|---|
| Web: Published<br>Word count: 0 | Print: Draft<br>Est. length: 25-30 | Print: None<br>Budget: 12:49am |
| Slug: Voterform  Print section: News  Page: Unassigned<br>Web title: Toledo City Counsil<br>candidate campaignes...  Section: Politics | Print: Draft | By: Jennifer Feehan<br>Editor: Bettyann Cole<br>● Web: 5:09am today<br>Print: Torromow<br>Budget: 3:18pm |
| Web: Published<br>Word count: 462  ◆1 | Est. length: 15  ◆1 | |
| Slug: slashfund  Print section: News  Page: A1<br>Web title: Counsil raiding<br>slush fund  Section: Local | Print: Need approval | By: Blade Staff<br>Editor: Nick Schroder<br>● Web: 3:15pm yesterday<br>Print: Saturday<br>Budget: 12:49pm |
| Web: Published<br>Word count: 1322  ◆2  ▭1 | Est. length: 35  ◆2 | |

| Slug: Tornado | Print section News | Page: A3 | 1 photo request | By: AP |
| | | | | Editor: Greg Braknis |
| Web Title: More than 100 feared dead in Missouri tornado | | Section: Local | View package | ● Web: 11:49am today |
| | | | | Print: Torromow |
| Web: Published | | Print: Draft | | Budget: 10:49pm |
| Word count: 442 | ◆6 ▭1 | Est. length: 15 | ◆2 | |

| Slug: Gernot | Print section: Local | Page: Unassigned | 1 photo request | By: Jennifer Feehan |
| | | | | Editor: Bettyann Cole |
| Web Title: Ex-school chief to get $552,850 in settlement | | Section: Education | | ● Web: 5:09am today |
| | | | | Print: Torromow |
| Web: Published | | Print: Draft | | Budget: 3:18pm |
| Word count: 653 | ◆1 | Est. length: 15 | ◆2 | |

| Slug: Flood | | | 1 photo request | By: Staff |
| | | | 1 video request | Editor: Nick Schroder |
| Web Title: Flooding closes roads, some Metroparks | | Section: Local | | ● Web: 11:49am today |
| | | | | ◔ Print: none |
| Web: Under edit | | | | Budget: 12:49pm |
| Word count: 122 | | | | |

| STORIES | | | | | | | | | |
|---|---|---|---|---|---|---|---|---|---|
| Sections | Publish Date | Channel | | | | | | | |
| Status | Pub Date | Price | Section | Title | Last updated | Media | Tags | Story ID |
| ○ Published | XX/XX/XX | | Neighborhood | Pictures are worth 1,000 words | XX/XX/XX | 2 | | 0518001 |
| ○ Draft | XX/XX/XX | | News | Then we can write our story | XX/XX/XX | | | 0519001 |
| ○ Need approval | XX/XX/XX | | Unassigned | Electronics cost lots of money | ⓠXX/XX/XX | | | 0509001 |
| ○ Need approval | XX/XX/XX | | Unassigned | What happens when | XX/XX/XX | | | 0506001 |
| ○ Draft | XX/XX/XX | | Unassigned | What is lorem Ipsum? | ⓠXX/XX/XX | | | 0506002 |
| ○ Approved | XX/XX/XX | | Sports | Local software company shows.... | ⓠXX/XX/XX | 1 | | 0504009 |
| ○ Published | XX/XX/XX | | News | Zachary's story | XX/XX/XX | | 1 | 0504008 |
| ○ Super-seded | XX/XX/XX | | News | another user story | XX/XX/XX | | | 0504007 |
| ○ Need approval | XX/XX/XX | | Unassigned | Yet another new story | XX/XX/XX | | | 0429001 |
| ○ Published | XX/XX/XX | 2 | Sports | He'd goes here, yes? | XX/XX/XX | | | 0428001 |

ELECTRONIC NEWSPAPER

CROSS-REFERENCE TO RELATED APPLICATION

This application claims the benefit of U.S. provisional patent application Ser. No. 61/476,411 filed Apr. 18, 2011 and U.S. provisional patent application Ser. No. 61/606,073 filed Mar. 2, 2012.

FIELD OF THE INVENTION

The present invention relates generally to a system and method for conveying information to a user. In particular, the invention is directed to an electronic newspaper.

BACKGROUND OF THE INVENTION

Advances in computer systems have increased accessibility of information in such systems to unsophisticated users. Advances in display technology, and the capability of computer systems for storing large quantities of useful information, has increased the need for access of such systems by people who do not use them often enough to feel comfortable with traditional information display technology. Intensive efforts are underway in the computer industry generally to find improved ways to display information, and otherwise interact with relatively unsophisticated users.

For example, improvements in data storage and display technologies have combined to make an electronic book possible. Various proposals exist for making a device having the approximate size and shape of a hardback book. A goal of manufactures of conventional electronic books or e-readers is typically to display pages on a screen to look like an actual printed book. Such display technologies can be used with traditional computer display screens.

Conventional systems typically use an Adobe® Flash® compatible software as a plug-in application to convey information such as an electronic version of a newspaper to a user through a communication network such as the Internet. However, the use of the Adobe® Flash compatible software limits a tracking of the information being conveyed to the user and is reliant upon an intermediate software (i.e. Adobe® Flash® to convey the information to the user. Accordingly, certain devices not equipped with Adobe® Flash® software are not able to view the information intended for the user.

It would therefore be desirable to provide a system and method for conveying information to a user which are usable in an intuitive manner by a user without using Adobe® Flash® software. It is further desirable for the system and method to include a user interface that emulates an actual paper reading material such as a book or newspaper, for example.

SUMMARY OF THE INVENTION

Concordant and consistent with the present invention, a system and method for conveying information to a user which are usable in an intuitive manner by a user without using Adobe® Flash® software, wherein the system and method include a user interface that emulates an actual paper reading material such as a book or newspaper, has surprisingly been discovered.

In one embodiment, a system for conveying information to a user, the system comprises: a server receiving a data file representing an image; a software hosted on the server to generate an HyperText Markup Language environment including the image represented by the data file, wherein the HyperText Markup Language environment facilitates the manipulation of the image represented by the data file; and a user interface having a web browser to display the HyperText Markup Language environment to the user, wherein the image represented by the data file is viewable by the user.

The invention also provides methods for conveying information to a user.

One method comprises the steps of: generating a data file representing an image; generating a HyperText Markup Language environment; embedding the image represented by the data file into the HyperText Markup Language environment, wherein the HyperText Markup Language environment facilitates the manipulation of the image represented by the data file; and displaying the HyperText Markup Language environment to the user, wherein the image represented by the data file is viewable by the user.

BRIEF DESCRIPTION OF THE DRAWINGS

The above, as well as other advantages of the present invention will become readily apparent to those skilled in the art from the following detailed description of the preferred embodiment when considered in the light of the accompanying drawings in which:

FIG. 11 through FIG. 28 are screen shots related to the User Interface that are described in more detail below.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
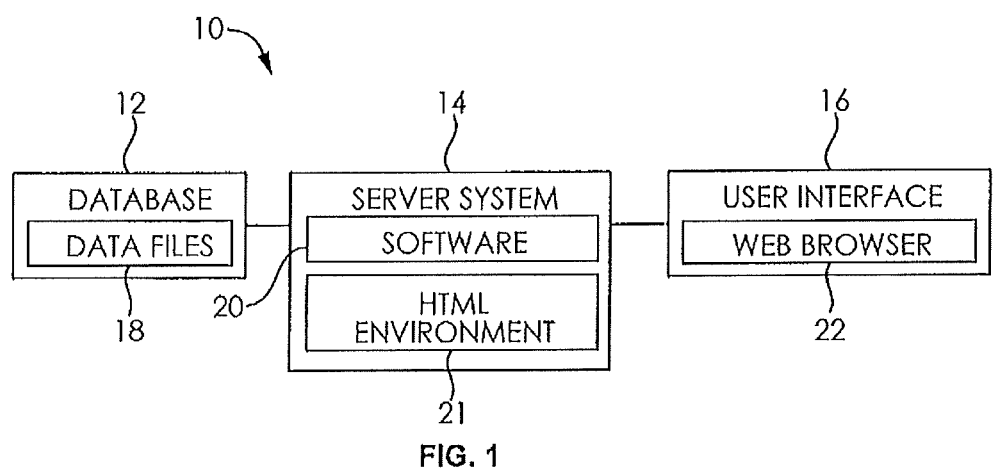
FIG. 1 is a schematic representation of a data management system according to an embodiment of the present invention.

Referring to FIG. 1 there is illustrated a data management system 10 according to an embodiment of the present invention. The data management system 10 includes a database 12, a server system 14, and a user interface 16.

The database 12 is in data communication with the server system 14. The database 12 is adapted to store information in an electronic medium. As a non-limiting example, the database 12 includes a plurality of data files 18 having a Portable Document Format (PDF). As a further non-limiting example, the data files 18 represent a replica of a printed material such as a daily newspaper. In certain embodiments, the data files 18 collectively represent a complete edition of a daily newspaper and are categorized by a standardized naming schema. However, it is understood that the data files 18 can have any format such as Portable Network Graphics (PNG) format for selective presentation to a user through a web browser, for example. As a further non-limiting example, the database 12 can include any data including data relating to conveying and displaying information in a Hyper-Text Markup Language (HTML) environment 21 (e.g. an HTML based webpage, a web-based viewable space coded in HTML, and the like).

The server system 14 is adapted to manage a data (e.g. the data files 18) stored in the database 12 and interconnections between the database 12 and various resources not stored on the database 12. The server system 14 may also be adapted to perform operations such as, a user query, a data transfer, a data retrieval, and a data processing, for example. It is understood that other devices may be used to manage the data stored in the database 12 such as a software engine and a software package, for example.

In certain embodiments, the server system 14 includes a software 20. The software 20 includes processor executable instructions to import the data files 18 from a periodic (i.e. daily) or constant feed (e.g. the data base 12). The software 20 includes instructions to convert the data files 18 to a HTML standard with graphic and multimedia objects, XML, RSS or Portable Network Graphics (PNG) format for selective presentation to a user through a web browser 22. The software 20 has instructions to present the data files 18 having the HTML standard with graphic and multimedia objects, XML, RSS or PNG format as objects in the Hyper-Text Markup Language (HTML) environment 21, wherein the HTML environment 21 facilitates the interaction (e.g. the manipulation of the image represented by the data files 18) and tracking of each of the data files 18 that are presented to a user.

The user interface 16 is interconnected to the server system 14 to transfer data between the user interface 16 and the server system 14. As a non-limiting example, the user interface 16 is interconnected to the server system 14 through at least one of a private intranet, a public internet, a local area network (LAN), a dial-up-connection, a cable modem, and a high speed ISDN line, for example. Other network devices may be used to interconnect the user interface 16 and the server system 14 such as a wireless network, for example. In one embodiment, the user interface 16 is a computer including the web browser 22 and is adapted for data transfer between the user interface 16 and the server system 14. The web browser 22 may be any browser for providing remote user access to the server system 14 such as Windows® Internet Explorer® (IE), Mozilla Firefox, Google® Chrome, Apple® Safari, and the like.

It is understood that the user interface 16 may be any user access device capable of interconnecting to the server system 14 such as a web-capable mobile phone, a personal digital assistant (PDA), and other mobile electronic devices, for example. It is further understood that the user interface 16, may include any number of user access devices, as desired. Any number of user interfaces 16 may be interconnected to the server system 14, as desired.

In use, a periodic or constant feed of the data files 18 is transferred to the server system 16 (e.g. from the database 12). In certain embodiments, the server system 14 converts the data files 18 to a HTML standard page with graphic and multimedia objects. The data files 18 are selectively presented to a user through the web browser 22 of the user interface 16. As a non-limiting example, the data files 18 having the HTML standard, with graphic and multimedia objects, format are presented to the user as objects in the HTML environment 21.

The user can view the data file 18 (representing the replica of the pages of the daily newspaper) on any browser-enabled device (e.g. user interface 16) without the use of the Adobe® Flash® formatted software. The HTML environment 21 allows the user to navigate to the data files 18 representing any portion of the collective data such as section fronts, pages, previous archived editions, and the like. The HTML environment 21 also provides a page viewing experience including: mouse following, keyboard/mouse support for page up and down scrolling, email features, search features, and customized viewing preferences such as mouse clicks for zoom in and out, for example. The HTML environment 21 allows the user to have full interaction with each page of the daily newspaper (represented by the data files 18) while providing data tracking to a browser-based analytics, now known or later developed. User tracking relative to various ones of the data files 18 presented through the web browser 22 can provide a feedback that is not currently available in the Adobe® Flash® format.

Figure 2:
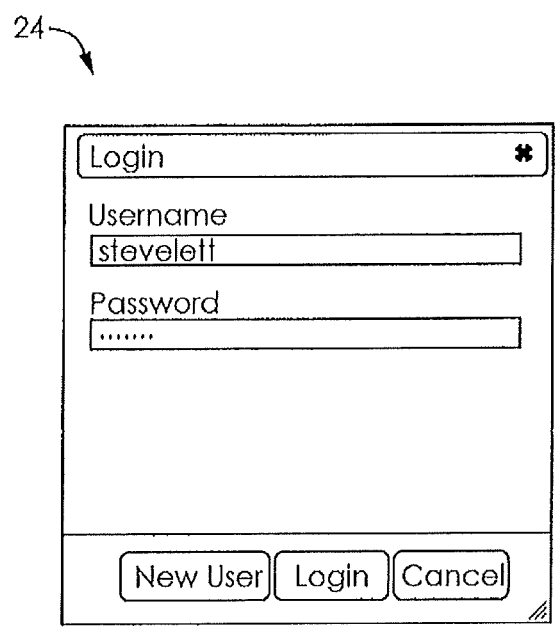
FIG. 2 is a screen shot of a log-in page of the system of FIG. 1.

FIG. 2 illustrates a registered subscriber log-in page 24 that is displayed on the user interface 16. Subscribers (i.e. registered users) enter credentials on the log-in page 24 to gain access to the data files 18 (e.g. the image(s) represented by the data files 18). Once the credentials are verified and accepted by the server system 14, an initial landing page 26 is displayed on the user interface 16, as shown in FIG. 3.

Figure 3:
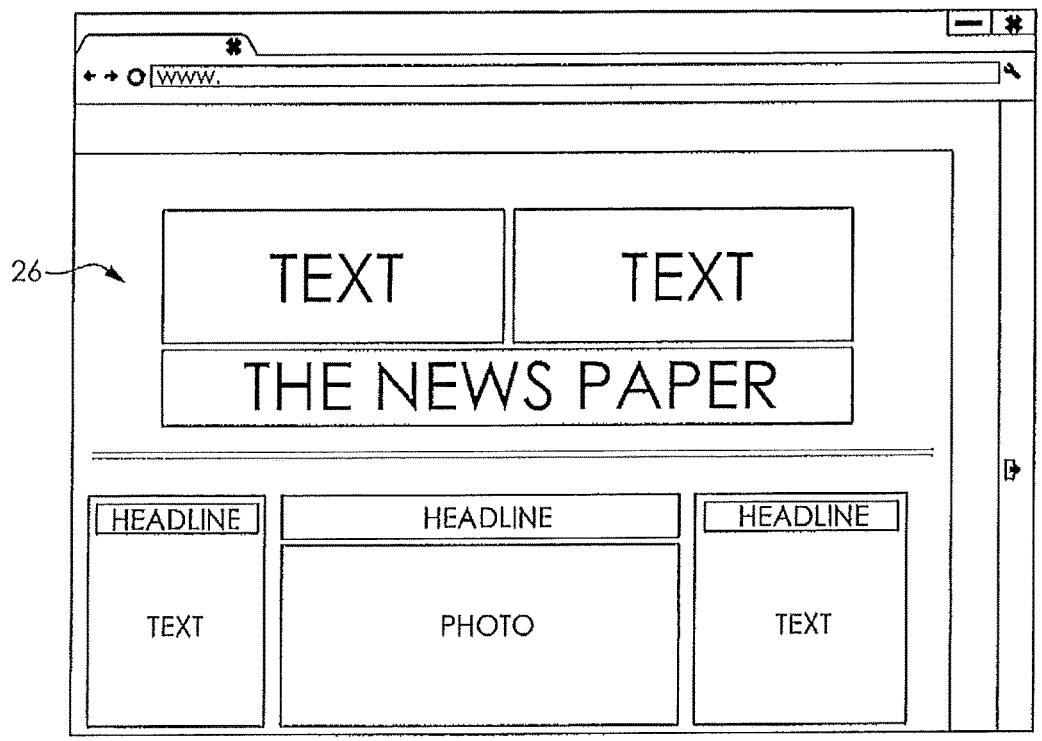
FIG. 3 is a screen shot of a landing page of the system of FIG. 1.
Figure 4:
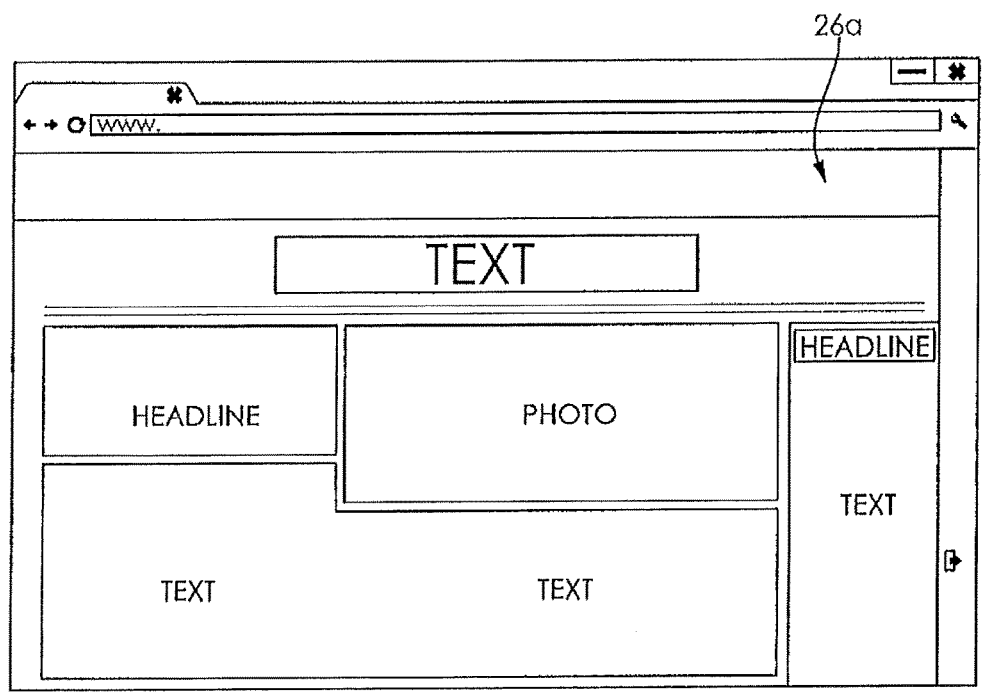
FIG. 4 is a screen shot of a page of the system of FIG. 1 illustrating a single page viewing mode.
Figure 5:
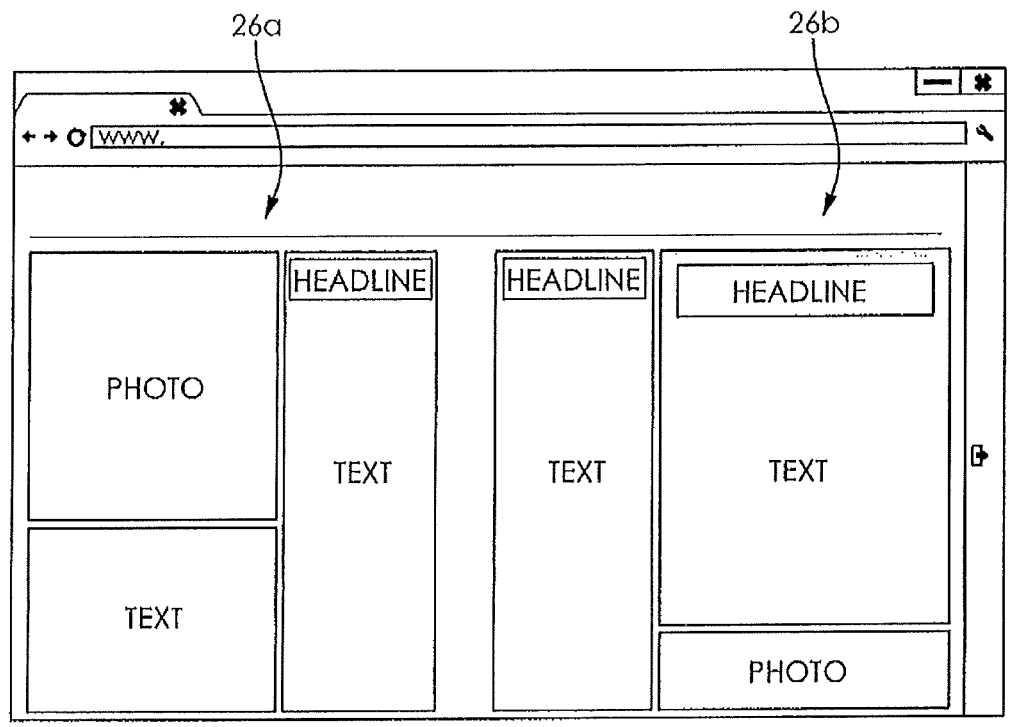
FIG. 5 is a screen shot of a page of the system of FIG. 1 illustrating a two-page viewing mode with zoom.
Figure 6:
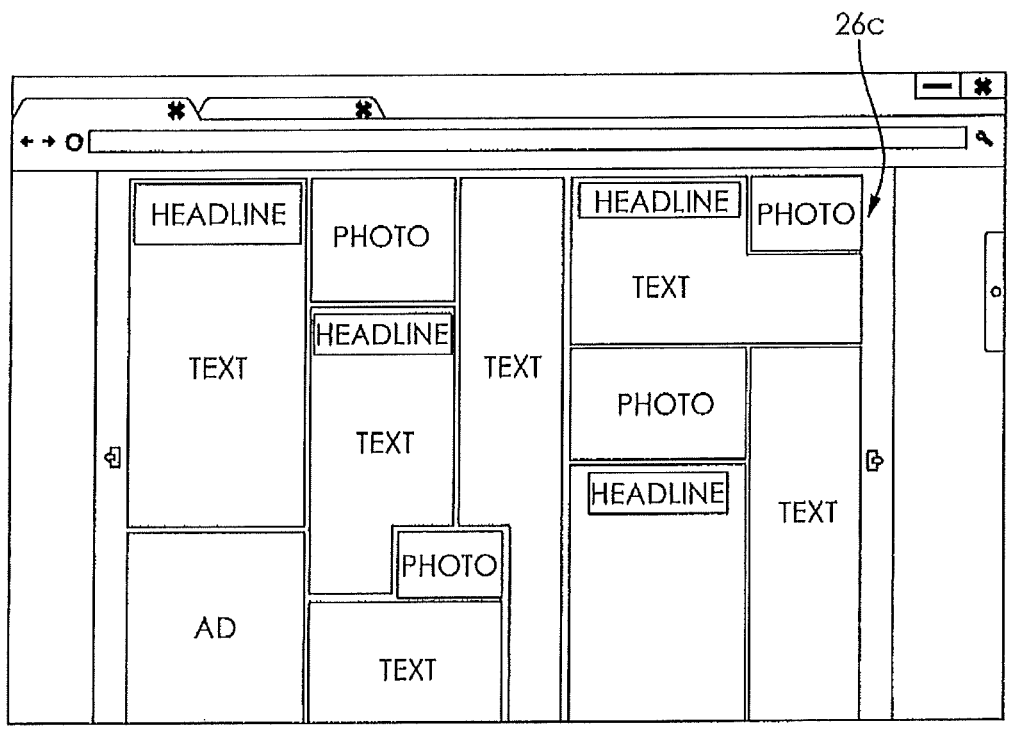
FIG. 6 is a screen shot of a page of the system of FIG. 1 illustrating a full two-page viewing mode.

Referring to FIGS. 3-6, the landing page 26, as well as other pages, can typically be presented to the user as a single page (shown in FIGS. 3-4), a two-page reader spread with zoom (shown in FIG. 5), or a full two-page spread (shown in FIG. 6). FIG. 3 shows the landing page 26 as the first page of the newspaper. FIG. 4 shows another page 26a that is page 2 of Section A of the newspaper. FIG. 5 shows the two-page reader spread with zoom as a portion of the page 26a and a portion of a third page 26b that is page 3 of Section A. FIG. 6 shows the full two-page spread 26c. It is understood that the user can select a viewing mode to control the manner in which the images/pages are presented on the user interface 16. As a non-limiting example, a front page (i.e. cover) of any publication represented by the data files 18 is displayed as a single page viewing mode since there is no facing page. However, any image or publication represented by the data files 18 can be viewed in a single page or a two-page viewing mode. As a further non-limiting example, each image displayed on the user interface 16 is automatically sized to a space provided by a window of the web browser 22. It is understood that other formats and viewing controls can be provided to the user.

Figure 7:
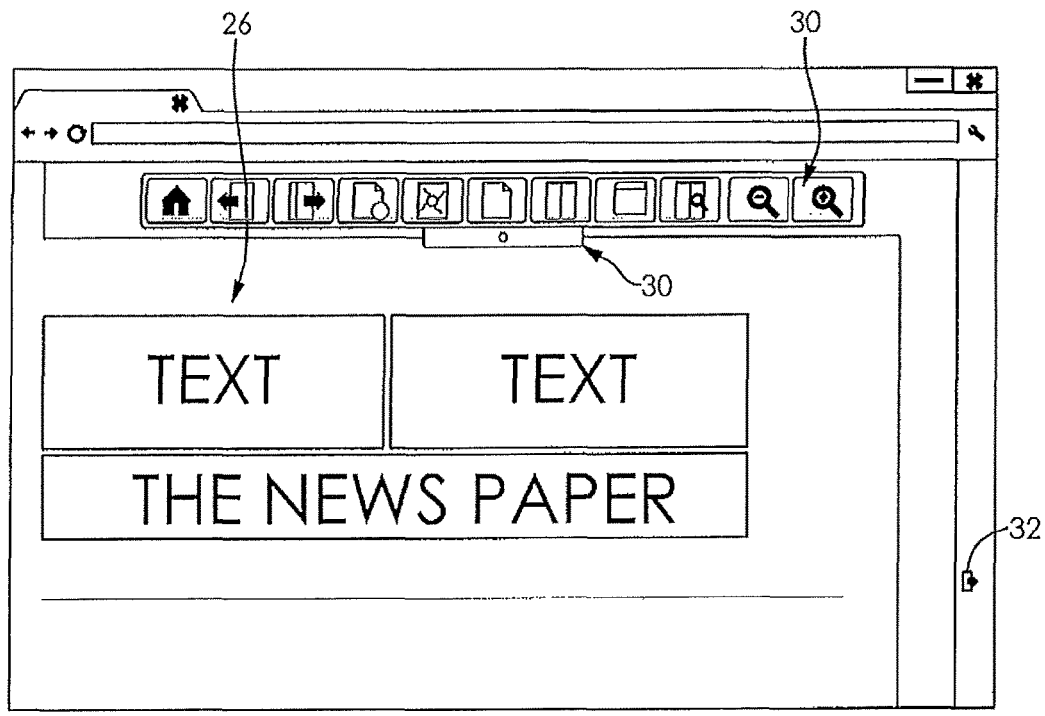
FIG. 7 is a screen shot of a page of the system of FIG. 1 showing a toolbar.
Figure 8:
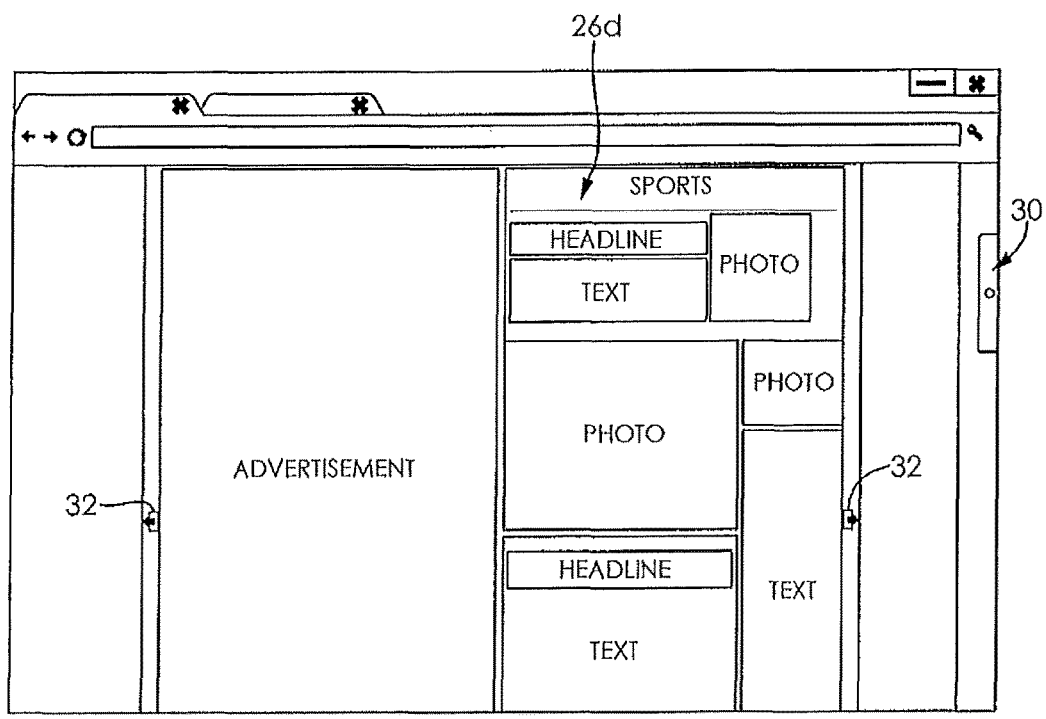
FIG. 8 is a screen shot of a page of the system of FIG. 1 showing additional control/display features.

Referring to FIGS. 7-8, a toolbar 28 and a plurality of navigation features 30 can be accessed from the landing page 26 and from all other pages or data files 18 representing pages. As a non-limiting example, the following tools can be made available to the user: 1) Go to HOME or the Initial Page View Mode; 2) BACK one page; 3) FORWARD one page; 4) SEARCH; 5) Email; 6) 2-page Full Height and Width View; 7) 2-page Wide View; 8) 1-page Wide View; 9) 2-page Single Page Wide View; 10) Reduce page magnification; 11) Increase page magnification up to 400%. It is understood that other tools and navigation controls can be made available to the user.

A plurality of page advance arrows 32 (e.g. arrows on the on the left and right of the viewable area 26d in FIG. 8) can be selectively engaged by the user to navigate through the data files 18 or images represented by the data files 18 in a sequential manner.

In certain embodiments, mouse-following navigation is enabled, wherein the user can navigate through the data files 18 or images presented by the data files 18 by moving the mouse in a right-left (previous page) or left-right direction (next page). Portions of the page in a non-viewable area of the user interface 16 can be accessed by moving a cursor of the mouse toward the non-viewable section. Accordingly, the image presented on the user interface 16 is manipulated to allow a user to view previously non-viewable section of the page. As a non-limiting example, a mouse wheel can be engaged to scroll and/or zoom. In certain embodiments, the user can access additional navigation and control features by moving the mouse or pointer to an edge of the window of the web browser.

Figure 9:
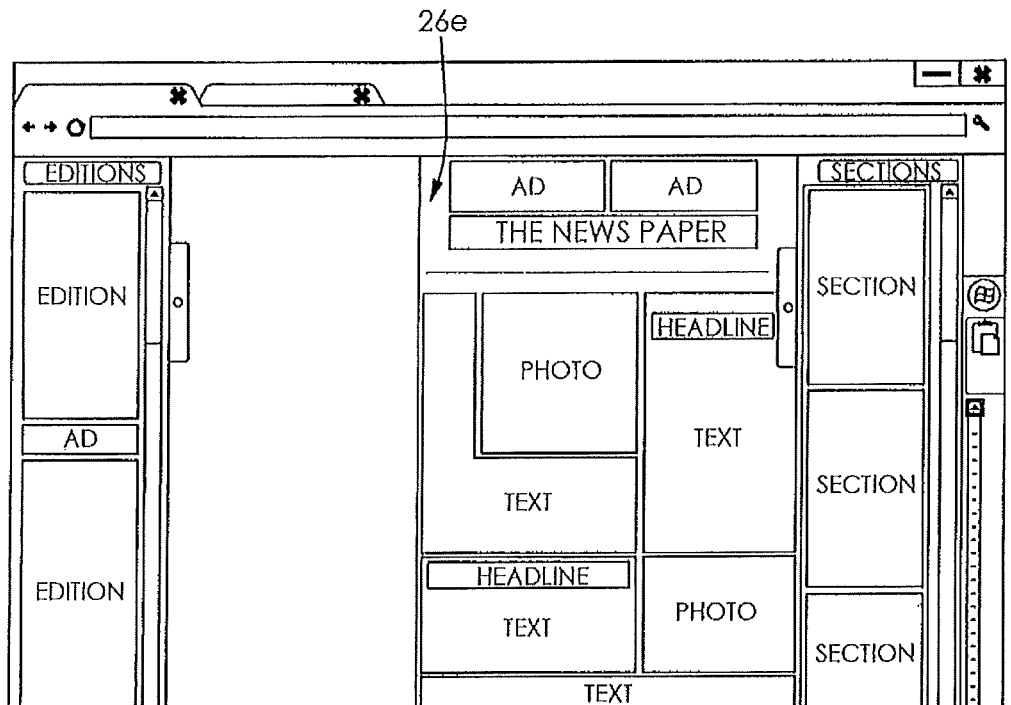
FIG. 9 is a screen shot of a page of the system of FIG. 1 showing a section/edition feature.

As shown in FIG. 9, a section/edition feature 34 is presented along a periphery of the view space of the web browser 22. The users can select an appropriate section or edition 26e of the printed publication represented by the data files 18 by selecting a thumbnail representation of the associated data file 18 or portion of the data file 18. It is understood that other means for quickly navigating between sections and editions of the publications represented by the data files 18 can be used.

Figure 10:
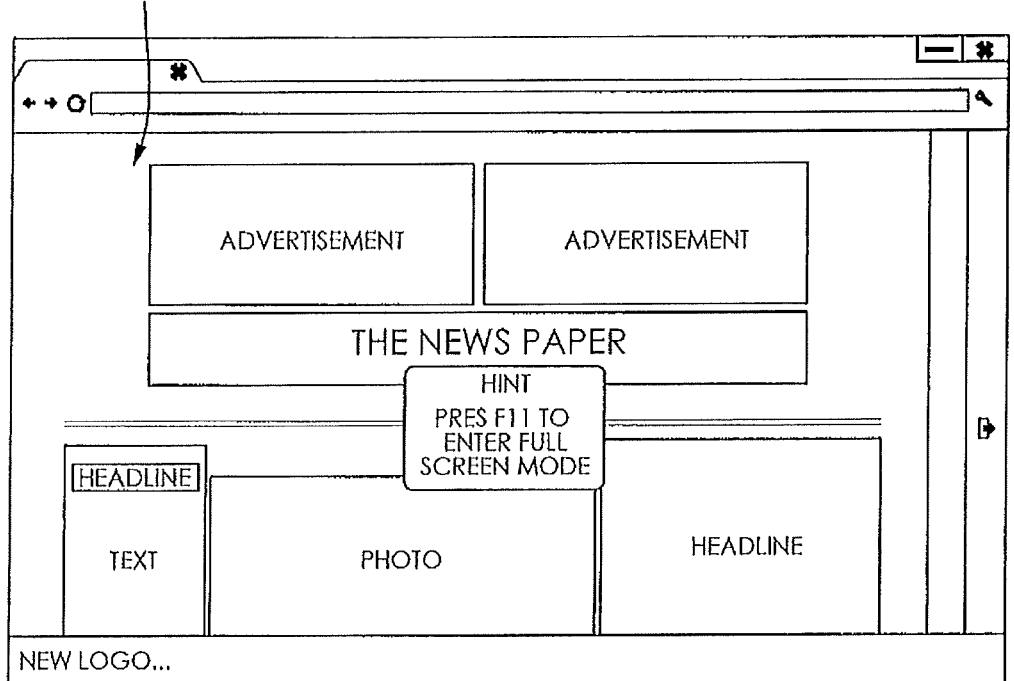
FIG. 10 is a screen shot of a page of the system of FIG. 1 showing an advertisement.

As shown in FIG. 10, an advertisement 36 can be conveyed to the user through the user interface 16. As a non-limiting example, the advertisement can be embedded in the HTML environment 21 and customized in a conventional manner. It is understood that the advertisements 36 embedded in the HTML environment 21 can be configured to disappear from the user interface 16 after a pre-determined time period.

In certain embodiments, the system 10 conveys information associated with the data files 18 to the user, wherein the information includes accessible hyperlinks that can be selected by the user to re-direct the user from the HTML environment 21 to another webpage.

The system 10 and method of the present invention provides an accurate and complete electronic rendition of the newspaper and other publications. The system 10 and method of the present invention are usable in an intuitive manner by a user without using Adobe® Flash® software and without requiring specific user training or instructive documentation.

The above description of a system and method for an electronic newspaper is included in the co-pending U.S. Provisional Patent Application Ser. No. 61/476,411 filed Apr. 18, 2011. The following relates to improvements in that system and method.

The system according to the invention utilizes a modified version of the Libercus Content Management System available from E. Viddal & Associates, 1413 S. Howard Avenue, Suite 220, Tampa, Fla. 33606. All access to the system database and functionality is accomplished through a standard web browser. Supported browsers include: Firefox versions 3.6 and later; Safari versions 5.0 and later; Google Chrome versions 10.0 and later; and Internet Explorer versions 8.0 and later. Supported operating systems include any operating system on which the above browsers are supported. To access all the system functionality, the incoming connection to the client machine should support a minimum speed of 3 Mbit download and 1 Mbit upload.

The basic requirements for page layout include: 1) Associating a story with a page; 2) Viewing stories assigned to a page; 3) Associating stories with shapes on page; 4) Shapes, defined; 5) Text editing and the database; and 6) Jumps. Under requirement 1), a user must be able to associate a story to a page from a Stories list or a Budgets list. The user must be able to associate a story to a page from within the page layout program. Assigning a Story to a Page will cause that story to take on a Page Link Status of "Assigned to Page".

Under requirement 2), from within the page layout program, the user is able to view the Slug data for Stories that are assigned to the page currently in use. From within the Pages list window in the UI (user interface described below), the user is able to view the Slug data for the stories assigned to a selected page.

Under requirement 3), the user is able to execute the following steps to place a story on a page: 1) Draw a text box on a page that is pre-loaded with the wanted typography, resulting in a Shape; 2) Modify the wanted typography by right-click and selecting pre-configured choices; 3) Drag story from the list to the specified shape. The story will assume the typography based on the user's instructions provided when drawing the shape; 4) Assign a pre-defined shape to the story in the User Interface; and 5) Drag a story from the Stories list in the page layout program to the wanted x-y position on the page. The story assumes the typography based on the selected shape. The act of linking a story to a shape will cause the story to assume the Page Link Status of "Linked to Shape".

Under requirement 4), a Shape will consist of the following data:
a. Header styles: Style sheets that define the header typography, as follows: Label; Headline; and Deck.
b. Body styles: Style sheets that define the body typography, as follows: Byline; Byline credit; and Body.
c. Caption styles: Styles that define the caption typography, as follows: Caption credit; and Caption.
A Shape may also include: x-y coordinates for placement on a page; Total box depth; and x-y position of standing elements (photos, column sigs, fact boxes) relative to the entire shape.

Under requirement 5), the user is able to edit text on the page using tools provided by the page layout program. These edits must be committed to the database by a prescribed command. Examples:
a. Saving the Page document.
b. Clicking away from the edited story.
An indicator advises the user when changes are being written to the database. When text in a story with Page Layout Status "Linked to Shape" is edited in the text editor, those changes are reflected on the page. The user is advised that a story has been updated by another user. Updating a story's text on a page from the database is a user action.

Under requirement 6), it is possible for a story to start on one Page and finish on another page. This condition is hereafter known as a Jump. It is possible for a story to jump over several pages. The user will execute the following steps to jump a story: 1) Select the wanted story on the front page and execute "Create Jump" command; 2) Fill in a dialog box with the wanted jump page, jump words and jump shape; 3) Upon clicking OK, the jump line is created on the front page, automatically reflecting the wanted jump words and entry for the jump page, and the story's jump is assigned to the jump page in the wanted shape; 4) Upon placing the jump story on the jump page, the jump shape will contain the wanted jump words and page from which the story was jumped; and 5) Any changes to text that affect the flow of the jump is reflected on both the front page and all jump pages.

Document creation involves templates. Page templates are created using the web interface and stored as HTML documents in the database. These templates are used as the basis from which daily pages are created. The templates contain the publication's style sheets and layers. One layer is reserved for Ads. A template may contain predefined shapes to which stories may be assigned as described in the page layout basic requirements described above. The system receives the ad manifest from the ad layout system. The manifest must include the following information for each page: Publication date; Section letter; Page number; Wanted template (optional; if this information is not present, a default template will be referenced in the database and used to create the page); x-y position of each ad; Height and width of each ad in a common unit of measure (points, millimeters); and Filename and file path of each ad.

The system is able to receive ad manifests from any ad layout system which can provide the above information. Libercus will convert the information into a single LibercusAdXML format. This data will be read into the Libercus database. This information will be used to create the page objects with proper ad placement. Links are created to ad files using the path/filename provided by the ad layout system. If the ad file does not exist, the box will still be linked to that file. When a page is opened by a user, the system will poll the file system to determine whether ad files are present. When the ad file is found, it will be linked to the box and shown without further user intervention.

The Ad layer may or may not be locked by default. This will be a system setting. A naming convention is stored in the database, and this naming convention is used to create the file names for each page. This naming convention is provided by the Customer, and will in most cases correspond to the naming convention required by the customer's computer-to-plate or output system. During the processing of the ad manifest, the system checks to determine whether a file name that corresponds to the wanted page already exists. If it is found to exist, the system will not overwrite the existing file. It will simply change the ad information as directed by the new manifest.

Users may create pages in advance of the arrival of the manifest from the ad layout system. It will be understood that these page will not be for output and will not be created in place of pages for that publication date. The user clicks "Advance Page" in the Pages list window. A form will be presented to the user, asking for: Publication date (mandatory field, calendar); Name (freetext field, 32-character maximum); and Template name (dropdown, contains the names of existing templates). Upon clicking OK, the document is created based on the requested template with the name provided by the user. It will be saved on a path known to the database. The user may work on an advance page using the same methods used to work on pages created by the system. The user may send an advance page to proof output, but may NOT send an advance page to final output. The user may link an advance page to a production page. Upon opening this page, all work done on the advance page will be linked to the production page. The desired workflow from this point will be that the advance page will cease to exist and that all work done from this point will be done on the production page.

Pages carry workflow statuses that correspond with the page's readiness for publication. Those statuses are defined as follows: New; Advance; Working; Ready for Proofing; Approved; Output; and Archived. New is a Production Page's status upon creation. Advance is an Advance Page's status upon creation. Working is automatically applied and refers to opening a page in the page layout program that automatically changes the page's status to Working. Ready for Proofing is manually applied and refers to when all of the stories on a page have reached the status Approved, the user marks the page Ready for Proofing. Approved is manually applied and refers to when the page has been approved for publication, the user marks the page Proofing Complete. Output is automatically applied and refers to when the page output process has been successfully completed, the page's status automatically changes to Output. Archived refers to at a time set in the system's administrative setting, all pages that have reached the status of Output will automatically change to Archived. These pages, and all stories placed on these pages, are locked for further editing. The page may be unlocked by a user with appropriate permissions.

The Pages interface contains a visual thumbnail representation of the Page's workflow status and the workflow status of each story placed on each page.

Automatic image processing workflow involves PDFs for output being submitted to the image processor for CMYK or grayscale pages as directed by the output process. The appropriate profile is attached to each image and the image is converted to the appropriate color space. PDFs submitted for eBlade output will not be color processed. The images remain as RGB on each page.

Manual image processing workflow involves images being submitted to a file system folder for manual processing.

Proofing workflow—A page may be printed from the page layout program to a local printer at any time. The system uses the page layout program's process for proof printing.

Output workflow—A page must have reached the workflow status Approved before it may be submitted to the final output process. The system uses the page layout program's process for exporting to PDF. The system uses the customer's prescribed output naming convention for the PDF's file name. The system routes the PDF to the appropriate image processing channel. The system routes the processed PDF to the final output folder for the customer's RIP. If an error occurs at any point of the process, a visual indicator appears in the Pages interface and the file is routed to an error folder.

Roles exist to provide default access rights/functionality to a group of users (Group). When a Group is created, it must be assigned to a Role. The User Roles are hard-coded and are not configurable. A System Administrator is able to create new sites. The System Administrator has access to the functions under the System Administration menu in the user interface. A Staff user will have access to the site's admin interface. Users created by user-generated functions have the role of a Site User.

A Group is assigned to a Role. When a User is created, it is assigned to one or more Groups. The following groups may exist by default: Site administrators (Role: System Administrator); Content creators (Role: Staff); Editors (Role: Staff); and Site users (Role: Site Users). A Site Administrator may create a new Group by copying an existing group. A Site Administrator may configure the permissions assigned to a Group. If a User is a member of multiple Groups, all Group permissions are combined.

A User login is required to access functionality of the system. A User may be created in the interface and assigned to a Group at the time of creation. A User may be created outside of the interface. A user created in this manner will be assigned to the Site Users group. A user will be identified by the following metadata: User name; Display name; and Nickname. The User name is what the user will use to log in and has the following requirements: Mandatory; Maximum 32 characters; Must be unique; Allowed characters: a-z, A-Z, 0-9; and NOT case-sensitive. The Display name is what is shown on the Welcome page (for Staff and System Administrator users) and on the web site (for Site Users). For Staff users, the Display Name is the value that populates the Byline field upon creation of a new Story. The Display name has the following characteristics: Mandatory; Maximum 64 characters; and Allowed characters: a-z, A-Z, 0-9, hyphen, apostrophe, space. The Nickname is what will display for Site Users when posting Sermo comments. The Display name has the following characteristics: Optional, if not chosen, default is Display Name; Maximum 64 characters; and Allowed characters: a-z, A-Z, 0-9, hyphen, apostrophe, space.

User permissions are inherited from the Group(s) to which the User is assigned. If a User is assigned to multiple Groups, permissions will be combined. User preferences are set in the interface by Users who are members of Groups other than Site Users. The following User preferences may be set in the interface: 1) Columns chosen/not chosen per content type (see User Interface Functional Requirements above); 2) Arrangement of columns in content type list window; 3) Preference for Count in list windows; 4) Preference for default channel when viewing story list; 5) Default Page upon login to UI (Dashboard, Stories, Pages, Media Files, Congero, etc.); 6) Metadata fields to be shown in the Print-Friendly view for Budgets; 7) Date-time display in list windows; 8) Password; and 9) Default section upon content creation. System default will be No Section.

It must not be possible for multiple users to have the same User Name or Nickname. If a user attempts to use an existing user name or nickname, the field is highlighted and the user is presented a message: "(Username or Nickname) exists. Please choose a different user name." The password validation is required upon creation. "Enter password" and "confirm password" must match in order for the user to be allowed to continue. If the confirm password does not match, the "Confirm Password" field is highlighted and the user is presented a message: "Passwords do not match. Please re-enter the correct password." The Password requirements are: 6-24 characters; Allowed characters: a-z, A-Z, 0-9, underscore, hyphen, $, @; and Case-sensitive.

Access control is defined at the Group level. A User's access rights and permissions will be based on Group membership. Upon the creation of the site, the default Groups will have all permissions by default. A System Administrator may remove permissions as desired by unchecking the appropriate checkbox. A Group may be given access to create, modify and/or delete at the following levels: 1. Content type; 2. Section. Workflow status may also govern access to content within a particular content type. It is possible to grant a Group access to an item of a specific status.

A Channel defines for which content platform a Story is intended. All content other than Stories is considered channel-independent. A newly created site has two channels by default. Channel 0 is named "Web" and Channel 1 is named "Print." New channels may be created by users with the Role of System Administrator. Channel configuration is a System Administration setting. A Channel must be given a meaningful Name. This Name will appear in the Channel menu selectors. Upon creation, a channel may be designated as a Print channel by clicking the "Is Print Channel" checkbox. Content assigned to a Print channel content is subject to the following behavior: System default publication date for content of Print channel is "Tomorrow"; and Content designated as Print channel content will be subject to archiving as detailed above.

Sections may be assigned to one or more Channels upon creation. By default, all sections will be assigned to Channel 0 upon creation. When a user selects a Channel in the UI channel selector, the Section dropdown will populate with only the Sections assigned to that Channel. When a user assigns a Story to a Channel, only the sections available for the Channel will be presented in the selector in the Channel's Properties window. A Section is a method for categorizing content. Sections may be created by users of the Role of System Administrator. Sections are configured under Site Administration settings.

Section functionality is extended wherein a Section may be assigned to one or more Channels. All sections are assigned to Channel 0 (Web) by default. By default, a newly created Story is not assigned to a Section. A Story not assigned to a Section will behave as follows: May not be assigned to a Workflow Status other than "Draft"; Will not be shown in a Budget view; and Will by default be accessible only to the user who created it and users of Role of System Administrator.

Figure 11:
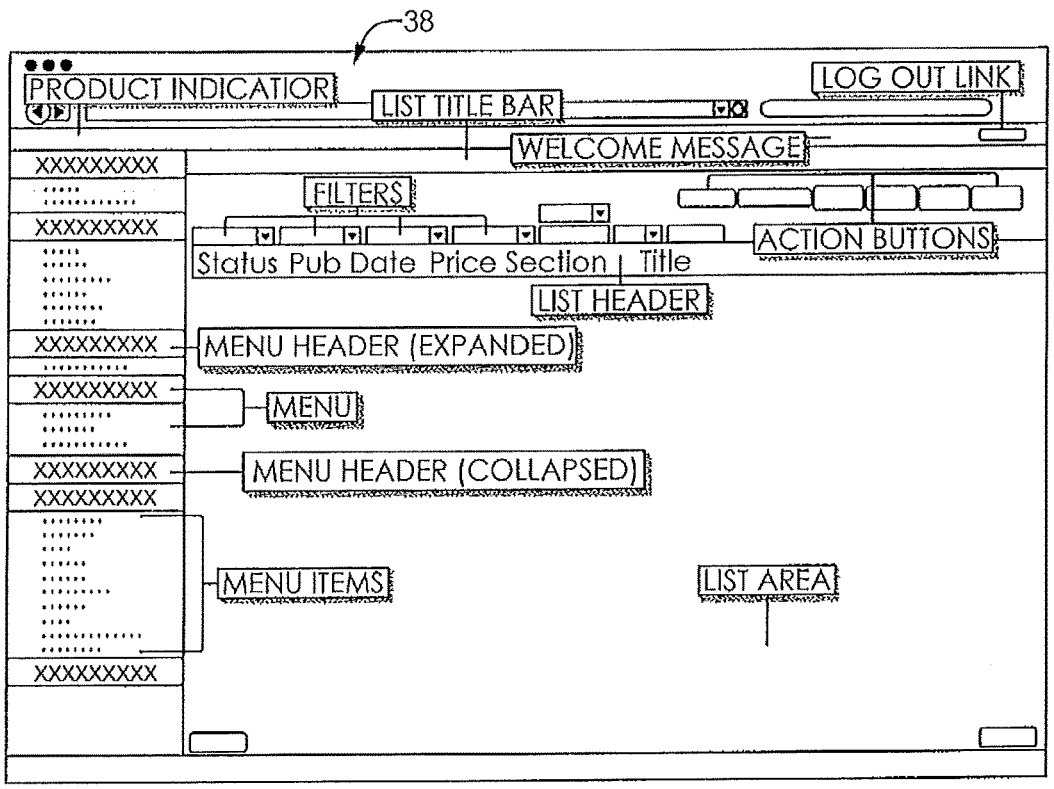

FIG. 11 is a screen shot of the main screen 38 of the system User Interface. Identified on the screen are: Product indicator; Welcome message; Log out link; Menus; Menu header; Menu items; List title bar; List filters; Action buttons; List header; and List area. The Product indicator shows the name of the product being accessed. The Welcome message shows the word "Welcome," followed by the user's Display Name. Click the Log out link to log off the system. Clicking here again will return the user to the login screen. Menus are shown to the user based on user role configuration. The user has access to menus for data types allowed by user role. Click the Menu header to expand or collapse. Click the Menu items to access data types. The List title bar shows the data type currently selected. List filters are shown based on selected data type. Action buttons are shown based on selected data type. The List header is shown based on selected data type. Functions within the List header will be dependent on selected data type. Chosen content is displayed in the list area.

Figure 12:
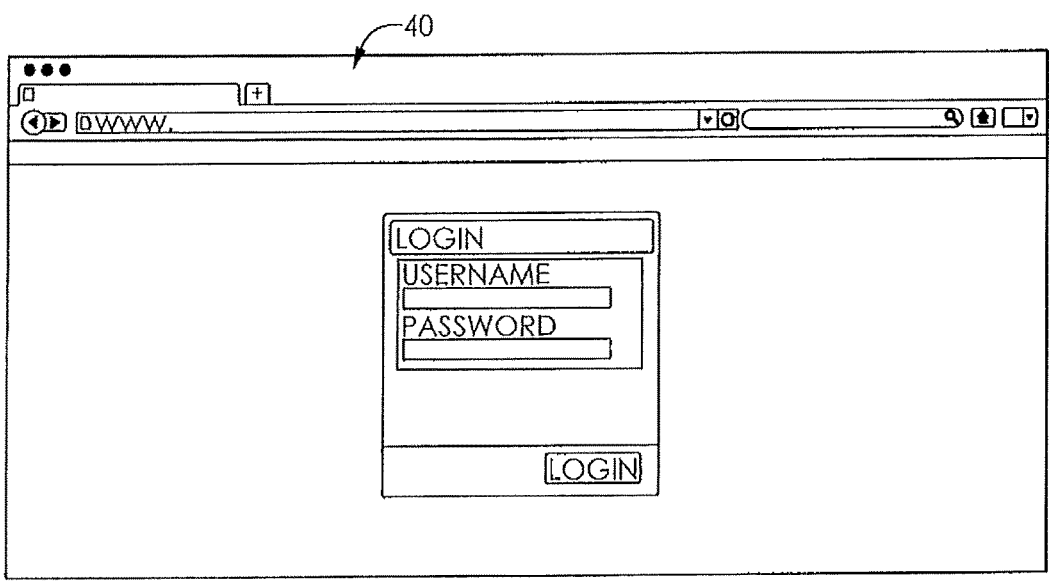
Figure 13:
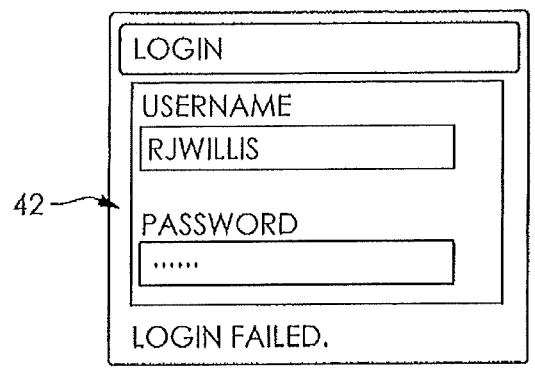

FIG. 12 shows the Login screen 40. When the user enters the URL for the system editing interface, the login screen will appear. Upon correctly entering the username and password and clicking the Login button, the user is brought to the default home page location saved in the user profile. If a user enters an incorrect user name and/or password, upon clicking the Login button, the login screen will return the message "Login failed" 42 as shown in FIG. 13

Figure 14:
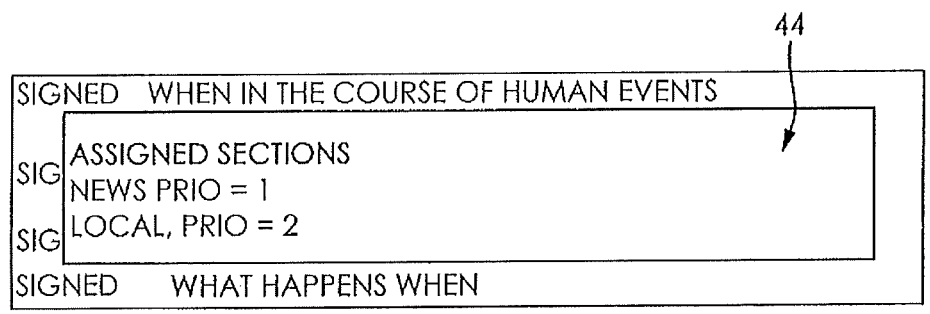

List items will contain a content preview. The content pre-view will be visible upon hovering over column data in a list 44 as shown in FIG. 14.

A tip box 46 will be generated by hovering over a system setting or property. The tip box 46 will contain brief documentation associated with that setting or property as shown in FIG. 15.

Properties that require the user to make a selection may be changed from within the list area with a click-to-select selector. Items for which the user may make only one selection will be presented in a drop-down click-to-select selector. Items for which the user may make multiple selections will be presented in a click-to-select selector with check boxes. Items in a list 48 which may be changed using click-to-select will highlight upon hover as shown in FIG. 16.

Upon click, the dropdown menu 50 will appear as shown in FIG. 17.

Upon a second click, the dropdown 52 will expand to show the available choices as shown in FIG. 18.

Upon making the selection and clicking the check box, the user's selection will be committed and the list item will return to its default state, showing the user's new selection. Behavior is as illustrated above, but check-boxes will be used to allow the user to make multiple selections. For free-text properties, double-clicking on the column in the list item will allow the user to edit the property from the list item. Clicking away from the list item will commit the change to the data-base. The default date display is mm/dd/yy, but can be changed in user preferences. The current date is shown as "today". The current date minus 1 day is shown as "Yesterday". The current date plus 1 day is shown as "Tomorrow". The default time display is hh:mm AM/PM in 12-hour format. This may be changed in user preferences to HH:MM in 24-hour format.

Figure 19:
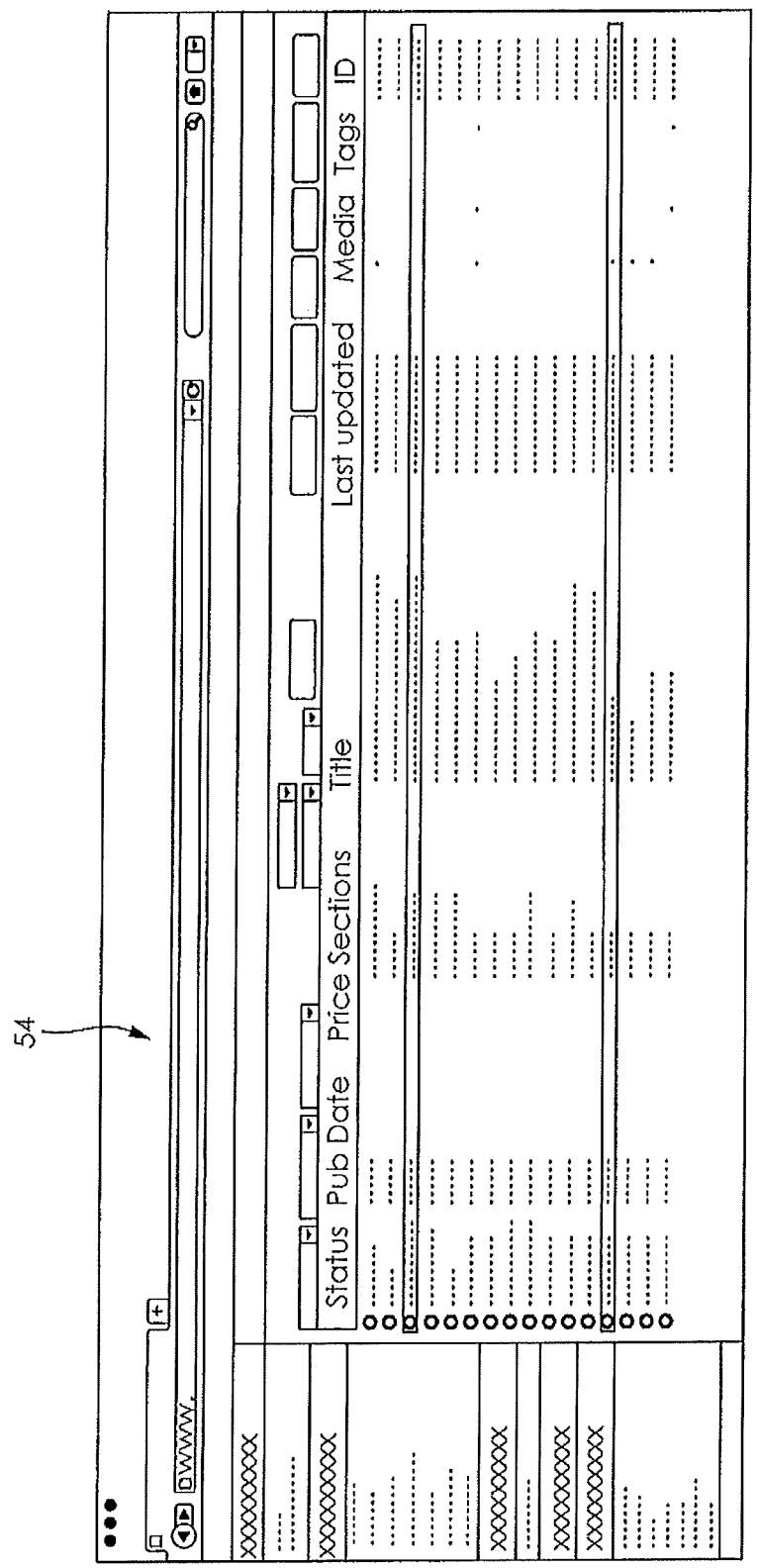

The Stories list view 54 shown in FIG. 19 displays the stories available for editing.

When the user clicks Stories under the Content menu, the filters for building a Stories list will be displayed. A user's default channel will be set in the user's profile. The user may select another channel by clicking the Channel selector. The Channel selection will determine which other metadata filters are available for the user. If the Web channel is selected, the following metadata filters will be available: Web workflow status; Publish date; Section; a customizable freetext field; and Count. The customizable freetext field has the following choices available: Freetext search; Author's name; and Editor's name. The Count selection can be saved as a default on the user's profile. Selections available in this selector are: 25; 50; and 100.

If the print channel is selected, the following metadata filters will be available: Print workflow status; Print publication date; Print section; Page; a customizable freetext field; and Count. The customizable freetext field provides the following choices: Freetext search; Author's name; and Editor's name. The Count selection can be saved as a default on the user's profile. Selections available in this selector are: 25; 50; and 100.

The user will click the Update button to execute the search. The user may change the search/filter criteria. The user will click Update again to see the new search results. The columns in the Stories list view 56 as shown in FIG. 20 will be displayed in the list header based on the selected channel. If the Web channel is selected, the following columns will be displayed by default: Status; Pub date; Prio; Section; Title; Notes; Last updated; Media; Tags; and Story ID.

If the Print channel is selected, the following columns will be displayed 58 by default as shown in FIG. 21: Status; Pub date; Slug; Notes; Calculated length; Page assignment; Last updated; and Media.

The user may choose the columns to be shown or hidden and save these choices in the user's profile. The user may choose to sort by any of the columns in the list by clicking on the column's header. The first click will sort by the chosen column ascending; a second click will sort by the chosen column descending. An indicator will show the ascending/descending choices next to the chosen column for sorting. Upon clicking Update, a list of stories will be displayed reflecting the user's sort and filter choices. If the count exceeds what can be displayed in the browser's window, a scroll bar will appear to the right, allowing the user to scroll to the bottom of the list. If the total count exceeds the count selected in the filter, clicking Next will show the next selected number of records. A progress indicator will be shown until those records are displayed.

Clicking on a story will open the selected channel of the story in the text editor. The far left column of each list item will contain a checkbox. Selecting this checkbox will allow the user to edit the story's Properties without opening the story for editing by clicking Quick Edit. If multiple stories are checked, the user may click Quick Edit to change the properties on all of the selected stories. If a story is under edit, the check box will be replaced by the Locked icon. Hovering over the Locked icon will indicate by whom the story is locked and the last modified date/time. If the user clicks on a story that is under edit, the story's channel will be opened in the text editor in read-only mode. When the Web channel list is displayed, hover behavior will be as follows: Section; Title; and Media. The Section shows all assigned sections and priority by section. The Title shows the title and first paragraph of the story. Media provides thumbnail previews and captions that will be shown for each linked image. When the Print channel list is displayed, hover behavior will be as follows: Slug; and Media. Slug shows the title and first paragraph of the story. Media provides thumbnail previews and captions will be shown for each linked image.

A Budget View 60 as shown in FIG. 22 will allow visibility of metadata for multiple channels to facilitate planning discussions and news budgeting.

When the user clicks Budgets under the Content menu, the filters for building a Budgets list will be displayed. The default Channel section will be All. The user can also filter by channel to build a list of stories associated with that particular channel. Other available filters will change based on the channel section. If All channels or the Print channel is selected, the available filter choices will be: Print Section; Print Publish Date; and a freetext field. The freetext field has the following defined choices: Text content; By; and Editor. If the Web channel is selected, the available filter choices will be: Web section; Web publish date; and a freetext field. The freetext field has the following defined choices: Text content; By; and Editor.

Upon clicking Update, a list of stories 62 will be displayed, as shown in FIG. 23, reflecting the user's sort and filter choices. If the count exceeds what can be displayed in the browser's window, a scroll bar will appear to the right, allowing the user to scroll to the bottom of the list.

Figure 24:
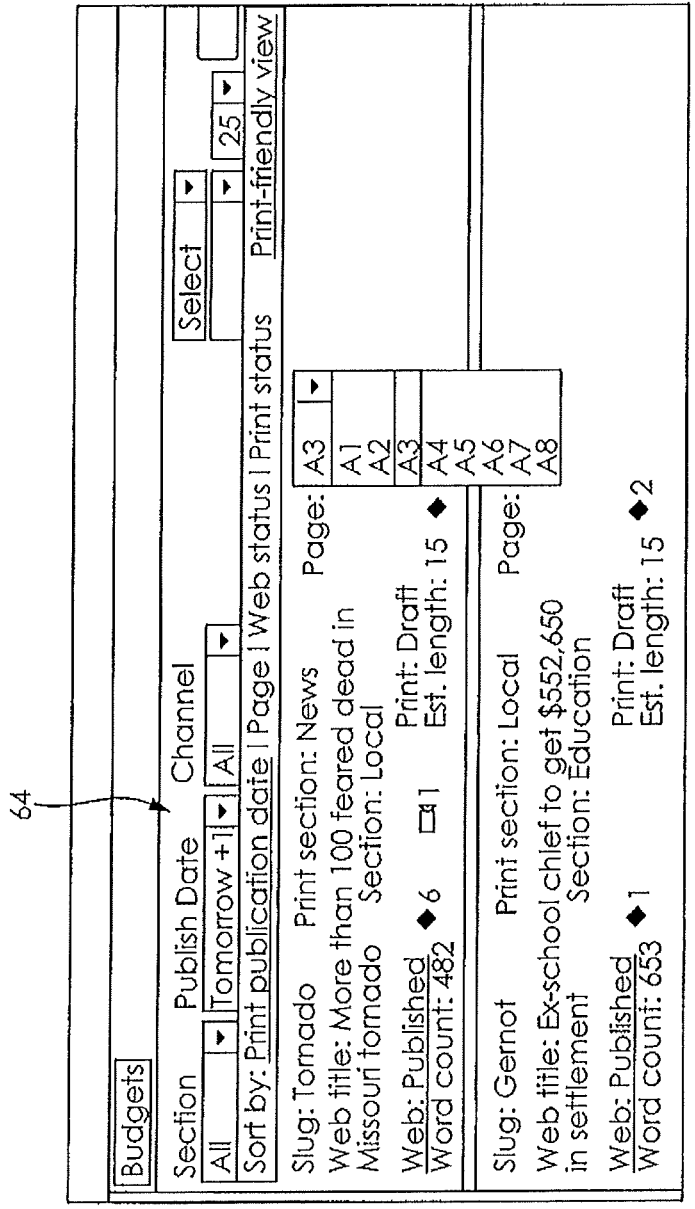

Each story will be displayed in a budget container 64 as shown in FIG. 24. The visible content will include: Slug; Print section; Page; Web title; Web section/priority; Web workflow status; Web word count as of last save; Number of linked images for Web channel; Number of linked videos for Web channel; Print workflow status; Estimated length of print story based on user entry; Number of linked images for Web channel; Photo request (true/false, count); Video request (true/false, count); By; Editor; Web channel last modified; Print channel publication date; and Budget properties last modified.

Figure 25:
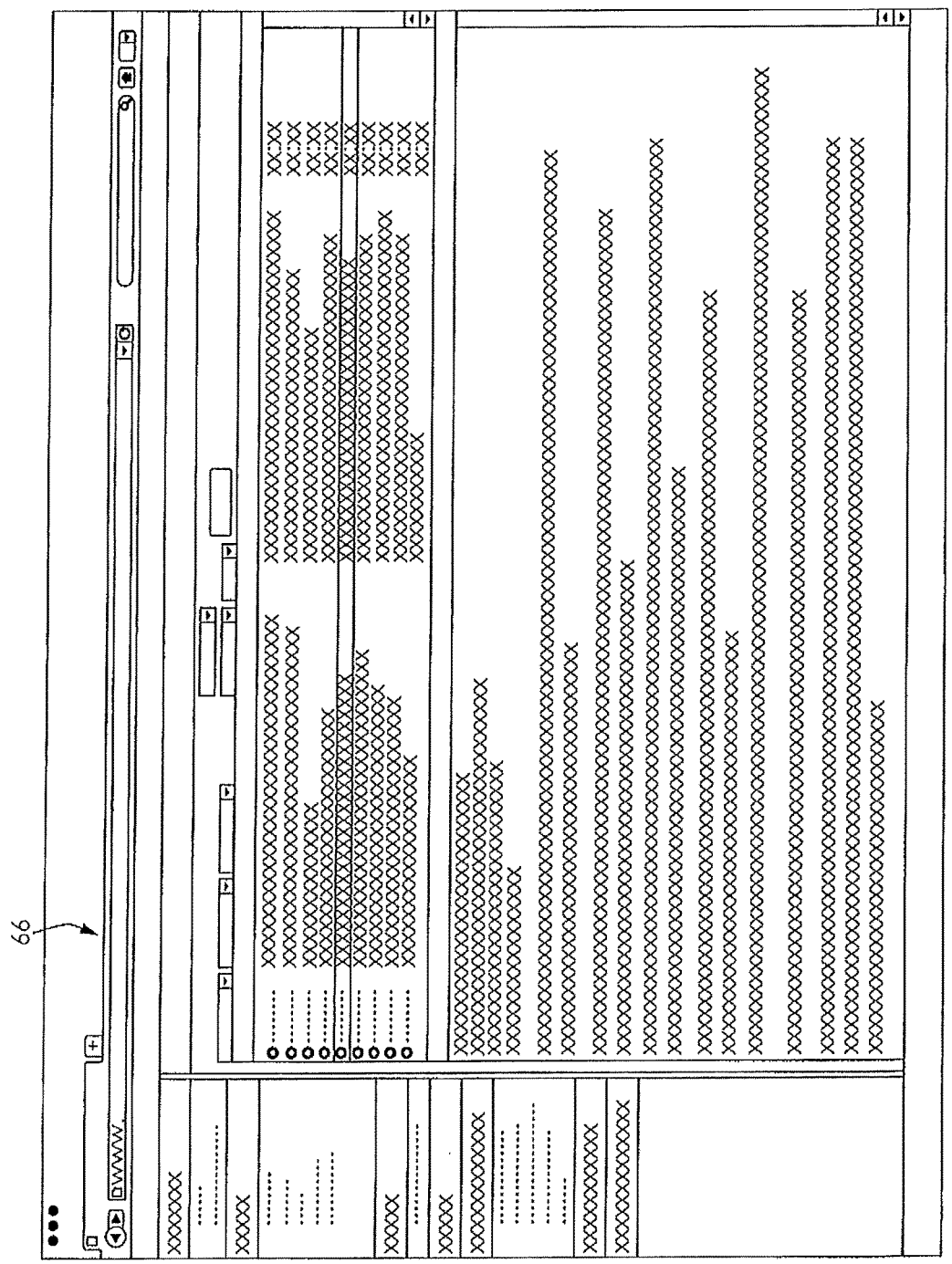

If a piece of data does not exist, nothing will be displayed in the container for that data. Example: If the story has not been assigned to a Print section, the Print section indicator and Print status indicator will not be shown. Functions within the budget container include: Slug; Print section; Page; Web title; Web section; Web workflow status; Print workflow status; View package; and Photo requests. The Slug is clickable and clicking here will open the Print version of the story for editing. The Print section is display only. The Page is click to select. When a story is assigned to a Print Publication Date and Print Section, the Page metadata value becomes "Unassigned". The user can assign a story to a Page by clicking the Page value in the Bud-get container. A dropdown menu 66 as shown in FIG. 25 will ensue showing the list of pages which exist on that publication date and belong to the assigned print section. An option "Other . . . " will exist, to display all of the pages that are associated with that publication date. If no pages exist on that publication date, a default set of pages that will be available for assignment on any publication date.

The Web title is click to edit. Clicking the title will open the Web channel version of the story for editing. The Web section is click to multi-select. Clicking here allows the user to add or change Web sections. The Web workflow status is click to change. Clicking here will allow the user to change the publication status. If the story is locked, a click will generate a dialog box which reads: "Web story %storyname% is currently being edited by %username%" and the story will be opened in the text editor's read-only mode.

The Print workflow status is click to select. Clicking this link allows the user to change the Print workflow status. If the story is locked, a click will generate a dialog box which reads: "Print story %storyname% is currently being edited by %username%" and the story will be opened in the text editor's read-only mode. Regarding the View package, if a story has internal links, clicking View Package will return the budget items of all of the story's internal links in the list under the originally selected item. Regarding Photo requests, if a story has a photo request associated with it, a text indicator will show the count of associated photo requests.

Clicking within the budget container will open the story's Properties. The Budget tab will be the active tab by default, with the Web and Print properties tabs available. If the Web and/or Print stories are locked, the user will have read-only access to the properties in the locked channel. The Properties windows that appear when clicking in the Budget view will be presented atop the Budget list. Upon clicking Save, the user will be returned to the Budget list, which will have been refreshed to reflect the user's changes, if any. Hovering over the story's budget container will display the Summary field for that story. The following metadata will be displayed to the right of the budget container: BY; Editor; Web; Print; and Budget.

By is the story's writer, user-assigned. The user can click to change this property by clicking the word "By". Editor is the story's editor, user-assigned. The user can click to change this property. Web is the last modified time for the Web channel. Indicators will show the web publication status as follows: Green (Published, live on the web); Yellow (Pending start of event (game coverage, concert reviews, stories off news conferences, etc.)); Red (Restricted, do not publish on web); and Orange (Embargoed, publish control active).

Print is the publication date for the Print channel, and is user-assigned or automatically assigned upon link to page. If the story is locked, the "Locked" indicator icon will appear to the left. Budget represents the last modified date/time of the Budget properties. Clicking the Print-friendly View link in the List Header will render a new window with all of the budget items in the list arranged for printing. In the User Profile, the user can define which fields should and should not appear in the print-friendly view.

A Multi-channel Text Editor allows users to view and edit stories for any or all defined channels. The only configured channels are Web and Print. However, similar functionality will be available for any configured channel. The basis of the functionality encompasses all existing text editing functions in the system.

When a user clicks the New button in the system interface in the Stories or Budgets list window, the user is presented a form in which metadata will be defined and selected. Clicking Create opens the Multi-Channel Text Editor. The window presented is the window of the default channel or the user's selected channel. The user is presented with the text fields that are defined for the selected channel. The Byline field will autopopulate with the byline information based on the contents of the Author field in the article's Properties. The user may click in any field and enter text. Clicking Save at any point will write the user's text to the database. Clicking away from the text editor at any point will prompt the user to save as follows: "Would you like to save the text?" If the user selects Yes, the text will be saved and the requested clickaway action will complete. If the user selects "No," the text will NOT be saved and the requested clickaway action will complete. If the user selects Cancel, the user will be returned to the text editing window and the changes will not be saved.

When a user selects Copy to Channel, the Save function will trigger, saving the existing content to the database. The user is prompted to select from the available channels. A check box will toggle the selections. Clicking Cancel will cancel the action and no channel version will be created. Clicking OK will copy all of the article's existing text to the selected channel(s). After the initial population of the new Channel(s), no further relation-ship will exist between the two channels. Each channel's text may be edited independently of the other. The editing interface identifies channels by color coding. This color coding is configured at a site administration level.

Existing find/replace functionality will be extended with a global find/replace, which allows the user to replace a string of text in all channels. The leftmost tab in the text editor identifies the active channel. Clicking on the Properties tab brings up the full list of properties. Only properties for the active channel may be edited. If another channel is locked, clicking on the locked channel's properties will indicate which user holds the lock. An abbreviated Properties panel is displayed within the text editor. This panel shows the following properties with the following functionality: Last modified date and time; A measurement, with the unit of measure determined by the channel. (Examples: Web=word count, Print=inch count) and the measurement will be a property of the Channel configuration; A "Save now" link, which will save and update the measurement; Web workflow status; Web section and priority; Print workflow status; Print section; Print page assignment; Print shape assignment; and Tags.

The Properties for the active channel will be active and may be changed by the user. The Properties for the inactive or unassigned channels will appear but will be grayed out, and will not be changeable by the user. When a user selects a story's channel, that user will hold the editing lock. Other users may access that story in the text editor's read-only mode. A single user may select more than one channel for editing simultaneously. A user may lock one channel for editing while another user has the lock on another channel. Opening the story's Properties window will give that user the lock on the metadata. Other users may view the properties in read-only mode. A force-unlock function will allow a privileged user to unlock a locked channel as necessary in instances where a story is locked but not actually under edit. When a channel is opened for editing, the user who opens the channel from the story list will hold the primary lock on all text fields (hereafter referred to as "first user"). A second user may request the lock on a field of the article held by the first user. The first user will be notified of the request and will be able to grant or deny the user access to the field. The second user will be notified of the first user's grant or denial.

A Comments mode is one of the text editing functions. A user may select a block of text and apply Comments mode. Text in Comments mode will not be published. Text in Comments mode will not be counted as part of the text measurement.

A wire text search allows for users to locate wire stories for publication on the web and in print. The interface also allows wire stories to be linked to stories as research or background material. The user will click Wires in the Content tab. This will present the user with a set of filters by which the wire search can be acquired. The available filters will include: Category (news, sports, etc.); Time frame (last x hours/days/weeks); Agency (AP, Reuters, McClatchy-Tribune); and a selector which includes the freetext searches (Name (which includes the AP transmission code: HKN, BKN, etc.), Content of text and Content of editor's notes). Clicking "Update" will present the user's selection in a list. The wire items will display in the List window in bold type. When the user clicks on the selection, the item will convert to roman type to indicate the story has been seen. Upon subsequent searches, unseen items will be presented in bold. Previously seen items will display in roman type.

When a user clicks on a Wire list item, a preview pane will be populated. This preview pane will show the text of the story and will be scrollable. Clicking another item will reload the contents of the preview window with the newly selected item. The top panel of the preview window may be moved by the user to show more or less of the previewed text. Moving the title bar down will allow for more list items to be displayed. Moving the title bar up will result in fewer list items being shown. The list will repopulate without further user interaction. If scroll bars are necessary in either or both windows, they will appear automatically with-out further user interaction.

When the user clicks "Use," a Properties window will appear, allowing a user to select the wanted channel destination(s) for the wire item. Metadata windows will be presented for the selected channel(s), allowing the user to route the story to a: Section; Publication date; and Publish control (online channels). A story may be used on one channel and also be copied for use on other channels as necessary. Each channel's version may be edited independently. Upon selection the "Use" link will convert to an icon indicating that the story has been selected for use. The user can select several wires for publication by clicking the check box to the left of the wanted items. Clicking "Use" on any of the checked items will present the user with a dialog box offering the user the choice of combining the items into one Story or converting each item into an individual Story. Stories that are used but not published may be deleted or routed via tags to hold or repurpose.

A wire may be attached to an existing story for research purposes. When a user clicks "Attach," a dialog box will appear with filters for the Story list. The user may locate the story in the list. Upon clicking Attach, the text of the wire will be added to the Story as an Attachment. The user may copy text from the attached wire and paste into the story.

Figure 26:
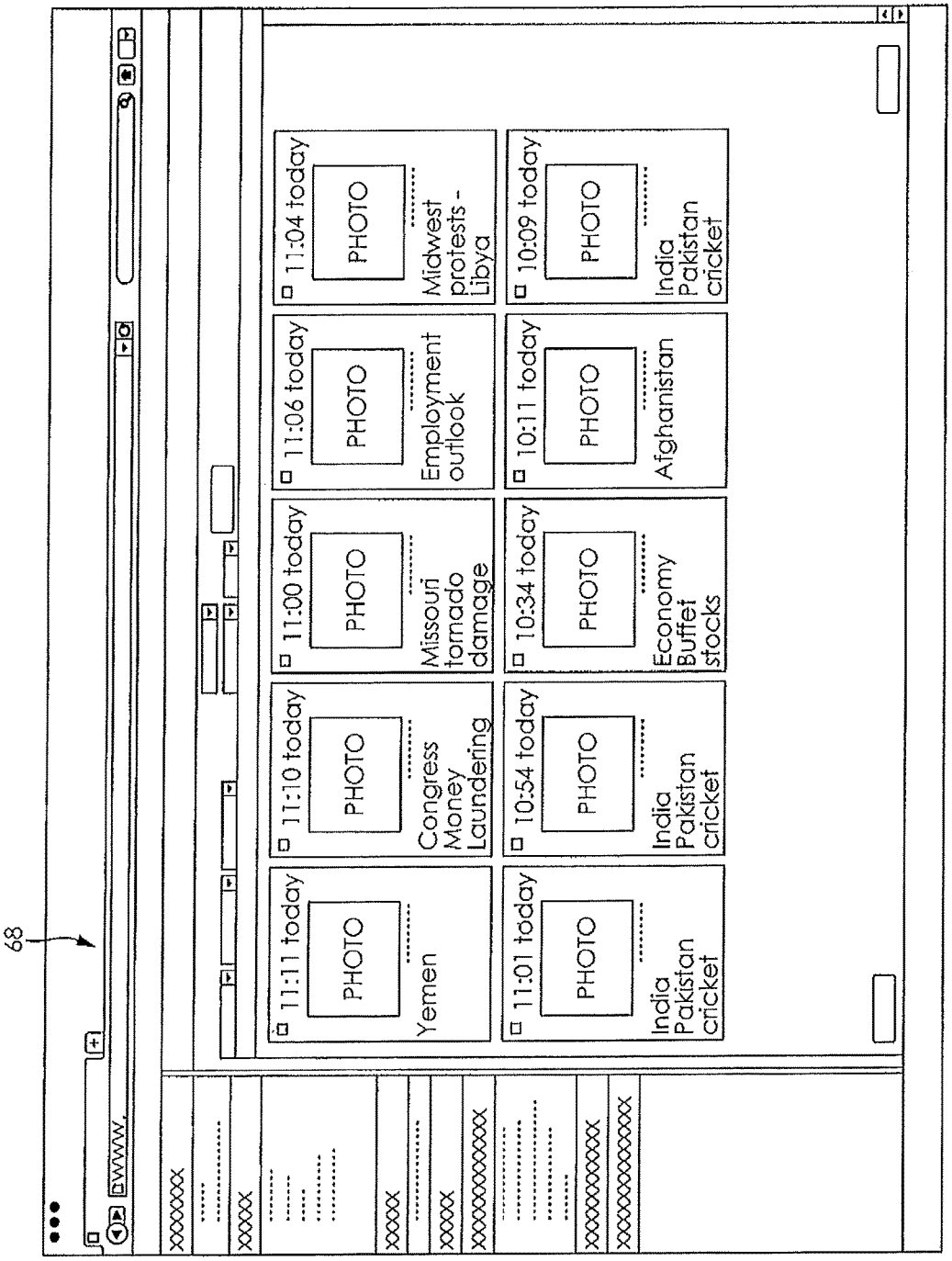

The wire photo search window 68 as shown in FIG. 26 allows users to search incoming wire photos and attach those photos to a story or gallery for publication. The user will click Wire Photos in the Content menu. This will present the user with a set of filters. The available filters include: Category (news, sports, etc.); Time frame (last x hours/days/weeks); Source (AP, Reuters, McClatchy-Tribune); and a selector which includes the following freetext searches (Name (which includes the AP transmission code: HKN, BKN, etc.), Content of caption text and Content of editor's notes).

Figure 27:
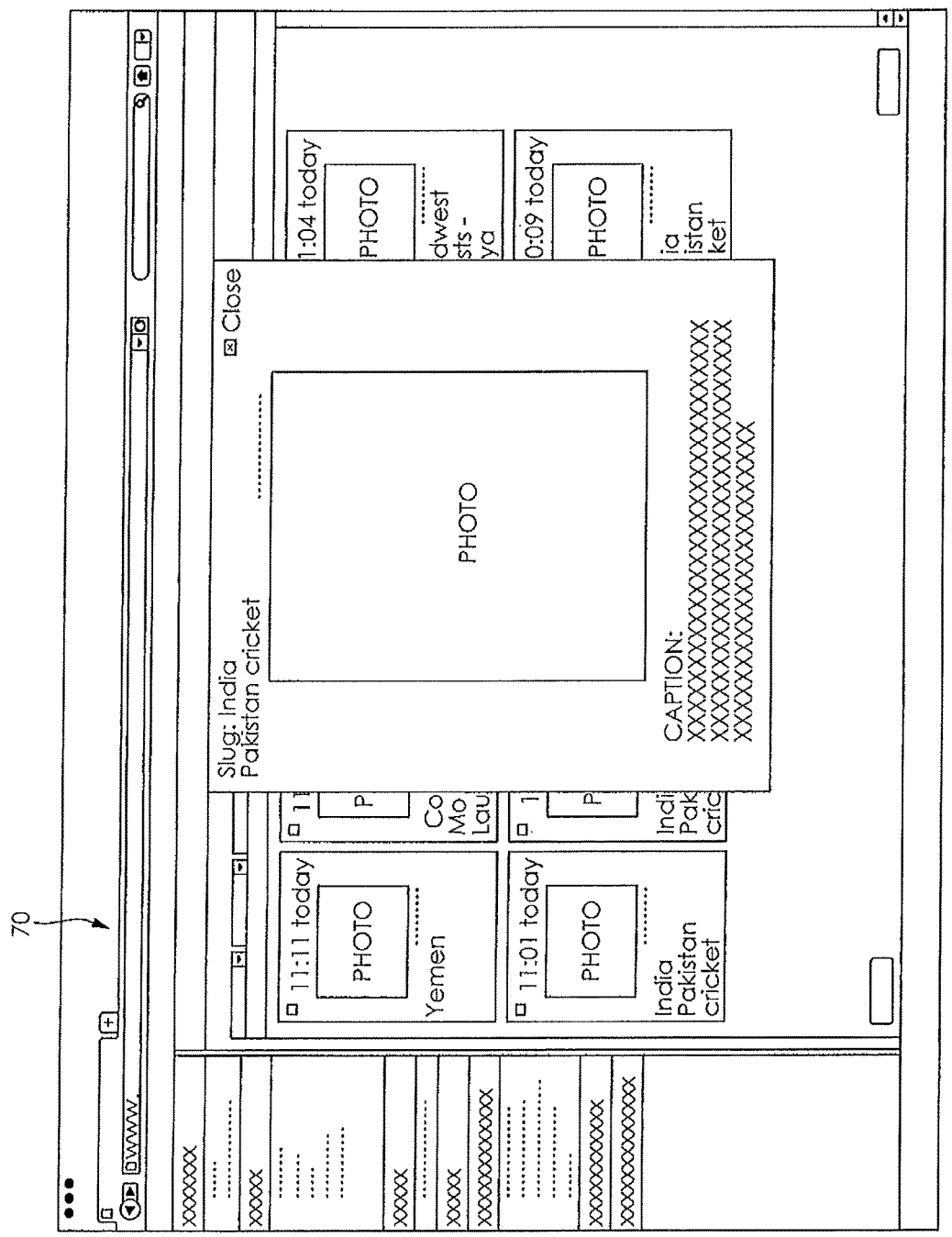

Clicking "Update" will present the user's selections in a thumbnail view. Clicking "Add to list" will add the photo to the Media Files list. Clicking "Link to Story" will present the user with a dialog box that includes a Stories list. The user may select a story from the story list to which to link the photo. Upon clicking Link, the photo will be linked to the story's selected channels. Clicking on the photo's thumbnail will generate a separate window 70 showing a full-size preview of the photo, the photo's Slug and Caption data as shown in FIG. 27. Clicking "Add to list" or "link to story" will perform the same functions described above. Clicking "CLOSE" will close the preview window.

All data types will contain a Notes metadata field. The Notes metadata field may be used to communicate information about a particular item that is not suitable/appropriate for other metadata fields and/or needs to be particularly highlighted to users. The Notes field will be accessible via the Properties panel. If an item has a Note, a speech-bubble indicator will appear in that item's listing in the list window 72 as shown in FIG. 28. Hovering over the Note indicator will allow the user to read the Notes for that item. Clicking on the Note indicator will allow a user to add a Note. All notes will be stamped with the date, time and username of the user who made the note.

The software 20 described above is separated into a comprehensive content management and production system (herein termed Libercus system) and a content presentation system (herein termed PageFlipper system). At the most basic level the PageFlipper system Phase 2 (PF2) provides a digital replica of a printed newspaper (e-Edition). This replica is static. It is produced once a day and is generated from the same PDF files that are used to produce the print product. Further, PF2 is not produced using the Libercus administrator interface. The PDF files are generated from any editorial content management system and then converted into PNG pages in the Libercus system.

Known electronic newspaper display systems force the user to click on an article which then opens up a separate window containing the article, photographs, etc. In general, the only way to read an article is in this separate window. Likewise, the only way to view the advertisements from the printed newspaper is to navigate to a "today's ads section" where all ads are presented on a single page.

In a unique manner, PF2 allows the reader to interact directly with the e-Edition, navigating directly on the e-Edition page without the need to click to read an article, or view photos and ads. Ads, articles, and images are presented in context in an identical manner to the print edition. This feature solidifies and reinforces the existing print advertising base.

Another unique aspect of PF2 is the production process. Known e-Editions are generated from the print PDF files. This is where the similarity ends. The known systems are far more manual in that they require a user to interact with the e-Edition system to produce the e-Edition. These known products use Adobe FLASH for user presentation. PF2 automatically converts the PDF files to PNG files which provides the user presentation. This allows the reader to interact directly with the page in PF2. The newspaper can specify active click zones, URLs, etc. directly in the page enabling the reader to interact with the ad and the page.

PF2 as well as the known products are static. They are not tied in any way to the main editorial content database. This means once the e-Edition is rendered or produced, the e-Edition remains static until the next day's set of print PDF files are provided and processed.

The PageFlipper system Phase 3 (PF3) is a fully integrated production and presentation system for delivering a digital replica of the newspaper or an e-Edition. This e-Edition can be either static or dynamic. PF3 provides a fully interactive and dynamic e-Edition reader presentation experience. Accomplishing this means that PF3 and the Libercus system are tied together on every level. By linking e-Edition content to the Libercus Content Database, changes to articles, ads, and other content can be automatically updated and reflected in the e-Edition. As breaking news changes, the digital rendition of the print newspaper is automatically updated. As new event photos become available, they are incorporated in the e-Edition.

All content included in the PF3 e-Edition originates, is formatted and generated from the Libercus system which is the production environment for PF3. All news stories are entered and edited in the Libercus system by journalists. All formatting for PF3 is controlled by the templates in the Libercus system. This includes the print layout which is identical to the PF3 e-Edition layout. These products use the same templates.

In addition, the Libercus system allows the publisher to create and layout tablet apps, web pages, as well as "future" products that are undefined. The layout and production engine for all of these new products is the Libercus system admin and edit interface. Libercus system is a comprehensive publishing content management and production system. News and content oriented products are called publishing channels in the Libercus system. Each piece of content is "linked" to other publishing channels for that content. Content can be published to multiple channels simultaneously. Content can be updated on demand for multiple channels simultaneously.

A unique characteristic is the 100% browser-based Libercus system Page Layout component. The layout component is natively cloud-based and provides a rich set of capabilities without the use of middleware such as virtual desktops from Citrix. The layout component was designed to be delivered using the browser and is therefore not an application that runs locally requiring local computing resources in the same sense as Adobe InDesign or Microsoft Office.

The Libercus system Page Layout component is architected to run efficiently in the browser by sending only the minimal data necessary to accomplish a task. It is not desktop application adapted to the cloud requiring far greater local resources to run properly.

Another unique feature is that the Libercus system browser based page layout component allows the customer to use the same templating engine across channels. The same templating engine is used to lay out a web page, iPad app, the PF3 e-Edition, and any other news delivery or advertising channel.

From a business model standpoint, not only can the Libercus system deliver dynamic content on demand to the various channels including PF3, it can completely tailor the presentation based on the "stored profile of the reader". For instance, the publisher can deliver ads based on geo location. These ads can replace the print ads on the e-Edition page and gain a higher ad CPM rate for the customer.

From the foregoing description, one ordinarily skilled in the art can easily ascertain the essential characteristics of this invention and, without departing from the spirit and scope thereof, make various changes and modifications to the invention to adapt it to various usages and conditions.

The invention claimed is:

1. A method for creating a first version of an electronic newspaper in a dynamic format and a second version of the electronic newspaper in a static format, comprising the steps of:
    importing data files from a database, the data files containing one or more of stories, articles and advertisements;
    converting the imported data files to a HyperText Markup Language (HTML) format;
    creating the first version newspaper in an HTML format from the HTML converted data files using page templates;
    presenting the first version newspaper in the HTML format in an HTML environment through a web browser of a remote user interface device, the first version newspaper in the HTML format being in the dynamic format interactive by a user of the remote user interface and dynamically updateable by a creator of the newspaper;
    converting the imported data files to a Portable Network Graphics (PNG) format;
    creating the second version newspaper in PNG format pages from the PNG converted data files using the same page templates of the first version;
    presenting the second version newspaper in the PNG format being in the static format as a static digital replica of a printed newspaper on the remote user interface device; and
    automatically updating the first version newspaper as changes to the data files and new data files become available, and updating the second version newspaper at predetermined intervals;
    wherein the created newspaper presented in either one of the HTML format and the PNG format is presented as any of a single page, two-page reader spread with zoom, and full two-page spread.

2. The method of claim 1, wherein page advance arrows are presented with the created newspaper to navigate through pages of the created newspaper in a sequential manner.

3. The method of claim 1, wherein the created newspaper in the HTML format includes an embedded advertisement configured to disappear from the user interface after a predetermined time period.

4. The method of claim 1, further comprising the step of generating data tracking feedback about the data files presented to a user.

5. The method of claim 1, wherein the HTML environment enables mouse-following navigation through the created newspaper.

6. The method of claim 1, wherein the HTML format page templates comprise page layouts for linking articles, viewing articles assigned to the newspaper, associating articles with shapes on a page, text editing, and multi-page story jumps.

7. A method for creating a first version of an electronic newspaper in a dynamic format and a second version of the electronic newspaper in a static format, comprising the steps of:

importing data files from a database, the data files containing one or more of stories, articles and advertisements;

converting the imported data files to a HyperText Markup Language (HTML) format;

creating the first version newspaper in an HTML format from the HTML converted data files using page templates;

presenting the first version newspaper in the HTML format in an HTML environment through a web browser of a remote user interface device, the first version newspaper in the HTML format being in the dynamic format interactive by a user of the remote user interface and dynamically updateable by a creator of the newspaper;

converting the imported data files to a Portable Network Graphics (PNG) format;

creating the second version newspaper in PNG format pages from the PNG converted data files using the same page templates of the first version;

presenting the second version newspaper in the PNG format being in the static format as a static digital replica of a printed newspaper on the remote user interface device;

automatically updating the first version newspaper as changes to the data files and new data files become available, and updating the second version newspaper at predetermined intervals;

wherein the created newspaper presented in either one of the HTML format and the PNG format is presented as any of a single page, two-page reader spread with zoom, and full two-page spread;

wherein page advance arrows are presented with the created newspaper to navigate through pages of the created newspaper in a sequential manner;

wherein the created newspaper in the HTML format includes an embedded advertisement configured to disappear from the user interface after a predetermined time period;

generating data tracking feedback about the data files presented to a user; wherein the HTML environment enables mouse-following navigation through the created newspaper; and wherein the HTML format page templates comprise page layouts for linking articles, viewing articles assigned to the newspaper, associating articles with shapes on a page, text editing, and multi-page story jumps.

* * * * *